United States Patent [19]
Ibaraki et al.

[11] Patent Number: 5,891,404
[45] Date of Patent: *Apr. 6, 1999

[54] EXHAUST GAS TREATMENT UNIT

[75] Inventors: Yoshihiro Ibaraki; Hidekazu Ina; Takayuki Makioka, all of Tokyo, Japan

[73] Assignee: Teisan Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 730,580

[22] Filed: Oct. 15, 1996

[30] Foreign Application Priority Data

Oct. 16, 1995 [JP] Japan .................................. 7-267500

[51] Int. Cl.$^6$ ............................ B01D 53/64; F23D 11/38
[52] U.S. Cl. ..................... 422/182; 422/168; 422/169; 422/171; 422/210; 431/284; 431/353
[58] Field of Search ................................. 422/182–183, 422/171, 168, 173, 169–170, 188; 431/5, 10, 284, 351, 353

[56] References Cited

U.S. PATENT DOCUMENTS

| | | | |
|---|---|---|---|
| 4,298,333 | 11/1981 | Wunning | 431/11 |
| 4,801,437 | 1/1989 | Konagaya et al. | 423/210 |
| 5,510,093 | 4/1996 | Barte et al. | 431/5 |

FOREIGN PATENT DOCUMENTS

| | | |
|---|---|---|
| 0 262 561 | 4/1988 | European Pat. Off. . |
| 0 285 485 | 10/1988 | European Pat. Off. . |
| 0 650 016 | 4/1995 | European Pat. Off. . |
| 0 735 321 | 10/1996 | European Pat. Off. . |
| 23 60 187 | 6/1975 | Germany . |

*Primary Examiner*—Hien Tran
*Attorney, Agent, or Firm*—Burns, Doane, Swecker & Mathis, L.L.P.

[57] ABSTRACT

An exhaust gas treatment unit of the combustion type is capable of effectively carrying out the decomposing treatment of an exhaust gas while at the same time allowing the unit to be reduced in size. The exhaust gas treatment unit includes a treatment drum, a combustion air introduction tube attached at one end of the treatment drum to introduce combustion air to the inside of the treatment drum, a fuel gas introduction tube disposed inside the combustion air introduction tube to introduce fuel gas to the inside of the treatment drum, and an exhaust gas introduction tube disposed inside the fuel gas introduction tube to introduce exhaust gas to the inside of the treatment drum. A flame tube extends from an end portion of the combustion air introduction tube on the air outlet side to the vicinity of the other end of the treatment drum, and a cooling air introduction port is provided for introducing cooling air into a space between the side wall of the treatment drum and the flame tube. By virtue of the presence of the flame tube, the fuel gas flame is kept for a longer period of time, thereby improving its contact efficiency with the exhaust gas.

14 Claims, 5 Drawing Sheets

EXHAUST GAS TREATMENT UNIT

FIELD OF THE INVENTION

The present invention relates to an exhaust gas treatment unit for treating exhaust gas discharges from a semiconductor manufacturing installation or the like, and especially to an exhaust gas treatment unit for decomposing inorganic fluorine compounds such as $NF_3$ and $SF_6$ or PFCS gases such as $CF_4$ and $C_2F_6$ contained in an exhaust gas.

BACKGROUND OF THE INVENTION

The manufacture of semiconductors results in the generation of an exhaust gas containing poisonous gases or gases which may cause environmental pollution such as $SiH_4$, $Si_2H_6$, $PH_3$, $NH_3$, $NF_3$ $SF_6$, $CF_4$ and $C_2F_6$. It is therefore necessary in facilities that discharge such exhaust gases to install an exhaust gas treatment unit to thereby decompose the exhaust gas until the concentration of these poisonous gases reaches an allowable concentration (TLV value) specified by law.

Known types of exhaust gas treatment units involve the use of a combustion type unit in which the exhaust gas is burnt by flame to effect decomposition. A general combustion type exhaust gas treatment unit utilizes a flame from a burner that is blown to the exhaust gas so that the exhaust gas is decomposed by its heat. Such a combustion type exhaust gas treatment unit can work effectively in the context of combustible gases such as $SiH_4$, $Si_2H_6$, $PH_3$ and $NH_3$.

However, in this known type of combustion type exhaust gas treatment unit, the flame is rather short from a duration standpoint. On the other hand, gases such as $NF_3$, $SF_6$, $CF_4$ and $C_2F_6$ tend to be very stable gases. Thus, a large-sized unit having a large capacity must be used and a large amount of fuel is required to decompose these gases.

In light of the foregoing drawbacks and limitations associated with known types of units, the present invention has been developed.

It is an object of the present invention to provide an exhaust gas treatment unit of the combustion type that is capable of carrying out the decomposing treatment of an exhaust gas effectively, while at the same time permitting the unit to be down-sized.

An exhaust gas treatment unit according to the present invention includes a treatment drum, a combustion air introduction tube attached at one end of the treatment drum to introduce combustion air to the inside of the treatment drum, a fuel gas introduction tube disposed inside the combustion air introduction tube to introduce fuel gas to the inside of the treatment drum, an exhaust gas introduction tube disposed inside the fuel gas introduction tube to introduce exhaust gas to the inside of the treatment drum, and a flame tube extending from the end portion of the combustion air introduction tube on the air outlet side in the vicinity of the other end of the treatment drum. A cooling air introduction device is provided to introduce cooling air into a space between the side wall of the treatment drum and the flame tube, and an outlet nozzle is provided at the other end of the treatment drum to discharge the treated exhaust gas.

A process to dispose of exhaust gas from a semiconductor manufacturing unit in accordance with the present invention involves injecting exhaust gas into a drum, reacting the exhaust gas with a flame of a fuel gas and oxygen containing gas in the drum in an oxidizing reaction to produce oxidized products, and controlling the temperature of the oxidizing reaction by cooling the wall of the drum. The oxidized products are filtered to remove solid particles and produce gaseous species which are then scrubbed to release only non-harmful species to the environment.

If a mixed gas of fuel gas and combustion air is ignited in such construction as mentioned above, a flame will go ahead through the flame tube, whereby a high heat situation can be maintained. As a result, the contact of the flame with the exhaust gas is effectively carried out.

To permit treatment of plural kinds of exhaust gases at the same time, a plurality of exhaust gas introduction tubes may be provided. From a similar point of view, the inside of one exhaust gas introduction tube may be divided into a plurality of exhaust gas introduction paths.

Further, a powder scrape-off means may preferably be provided in the vicinity of the end portion of the exhaust gas introduction tube on the exhaust gas outlet side so that oxides generated in the treatment of the exhaust gas such as $SiH_4$ are not deposited on the fore end of the exhaust gas introduction tube.

Oxygen enriched gas, e.g., air (containing approximately 21% oxygen) or oxygen enriched air, including substantially pure oxygen, can be used for the combustion, particularly to reach high temperatures necessary to decompose certain species.

The exhaust gas treatment unit of the combustion type according to the present invention can maintain a flame for a long period of time and can carry out its contact with an exhaust gas effectively because of the flame tube that is provided. Thus, it becomes possible to achieve the down-sizing of the unit, and even in a case where a small amount of fuel is used, it is possible to effectively carry out the decomposing treatment of stable exhaust gas, for example an inorganic fluorine compound such as $NF_3$ of $SF_6$, or any perfluorocompounds (PFCS) such as $CF_4$, $C_2F_6$ or the like.

Since cooling air flows around the flame tube, there is no need to provide a heat insulator on the outer circumference of the exhaust gas treatment unit. This further facilitates the ability to downsize the unit.

By mixing the cooling air with the treated exhaust gas in the exhaust gas treatment unit, the diluting treatment of exhaust gas is carried out during cooling and so the exhaust gas treatment becomes more effective.

BRIEF DESCRIPTION OF THE DRAWING FIGURES

Further details and features associated with the present invention will be more clearly understood from the detailed description set forth below considered in conjunction with the accompanying drawing figures in which like elements are designated by like reference numerals and wherein.

Figure 2:
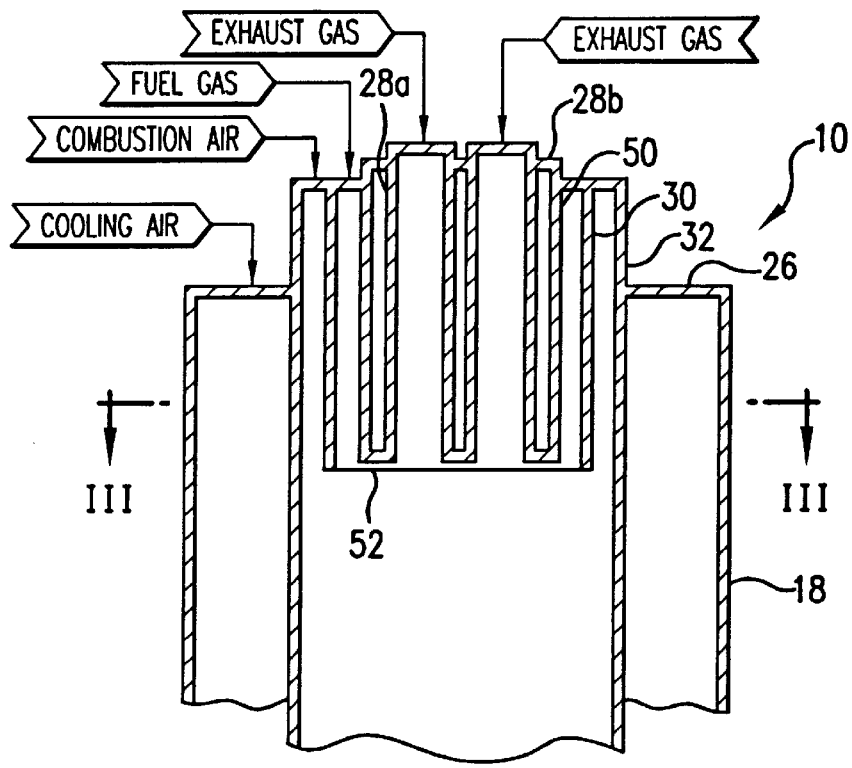
FIG. 2 is a vertical cross-sectional view showing a portion of the second embodiment of the exhaust gas treatment unit according to the present invention.
Figure 3:
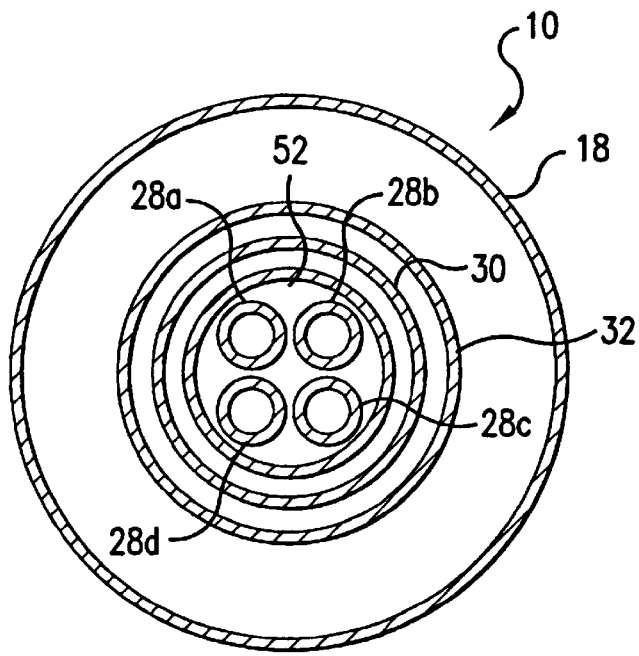
FIG. 3 is a horizontal cross-sectional view of the exhaust gas treatment unit taken along the section line III—III in FIG. 2.
Figure 4A:
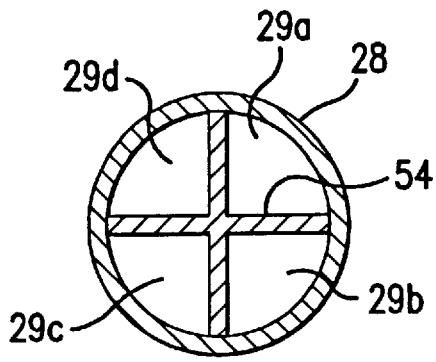
Figure 4B:
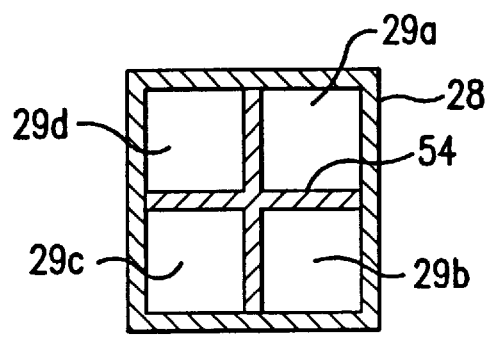
Figure 4C:
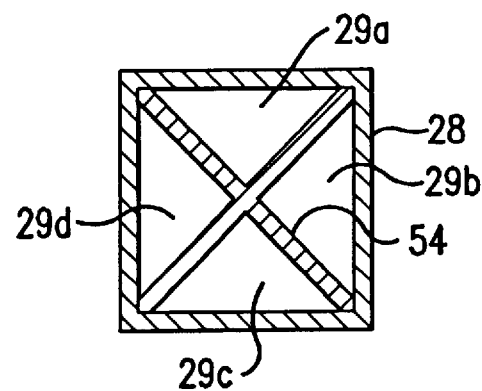
Figure 5:
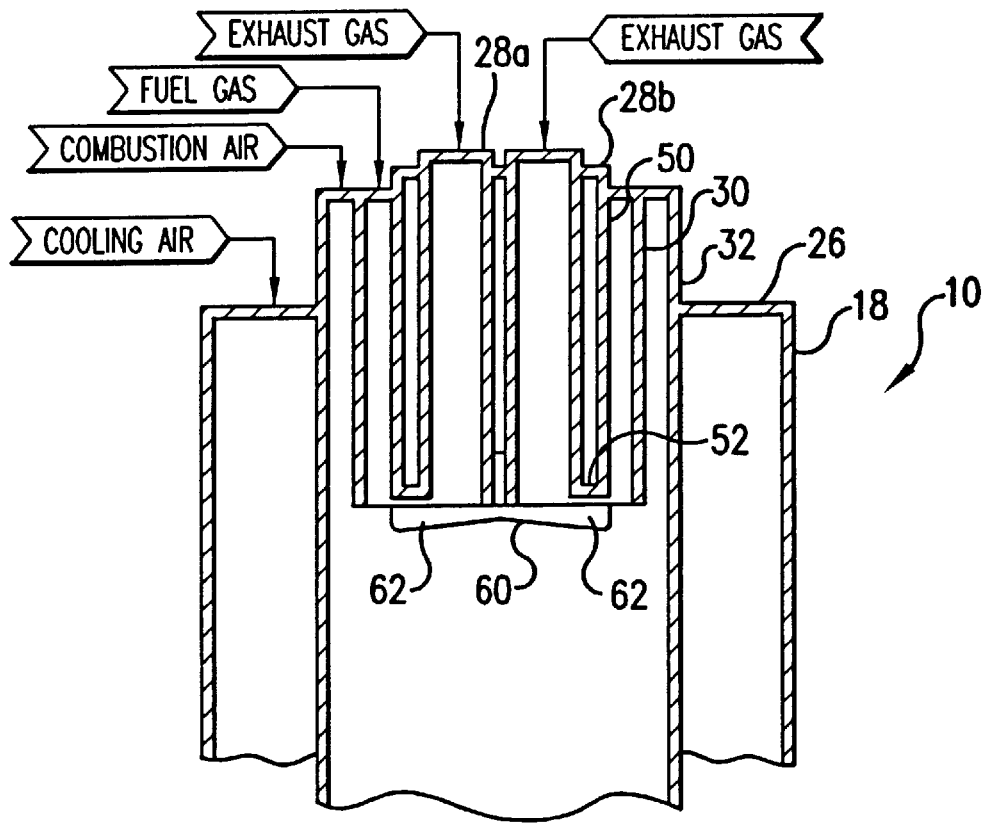
Figure 6:
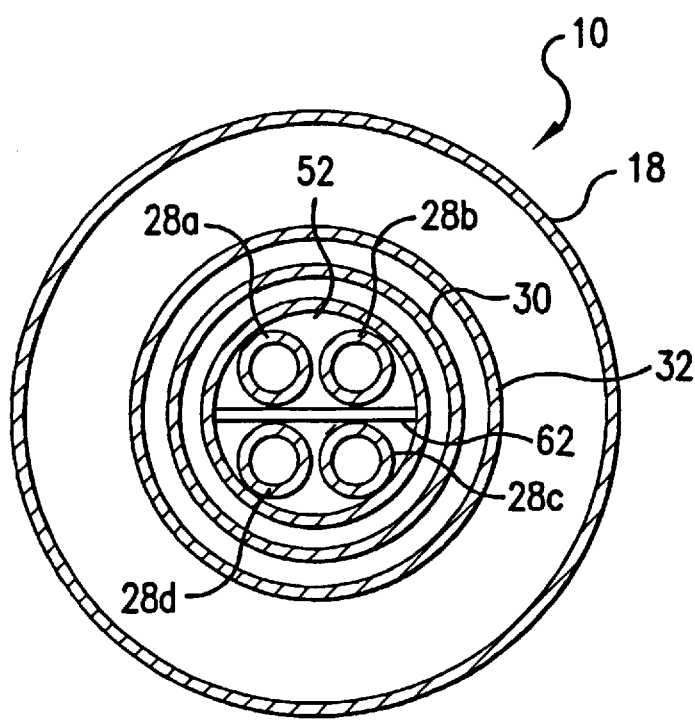

FIGS. 4(a)–(c) are horizontal cross-sectional views of an exhaust gas introduction tube having four exhaust gas introduction paths;

FIG. 5 is a vertical cross-sectional view of the exhaust gas treatment unit of FIG. 2, where an impeller is attached as a powder scrape-off device; and FIG. 6 is a cross-sectional view similar to FIG. 3, showing the impeller as accommodated in the unit.

DETAILED DESCRIPTION OF THE PRESENT INVENTION

Figure 1:
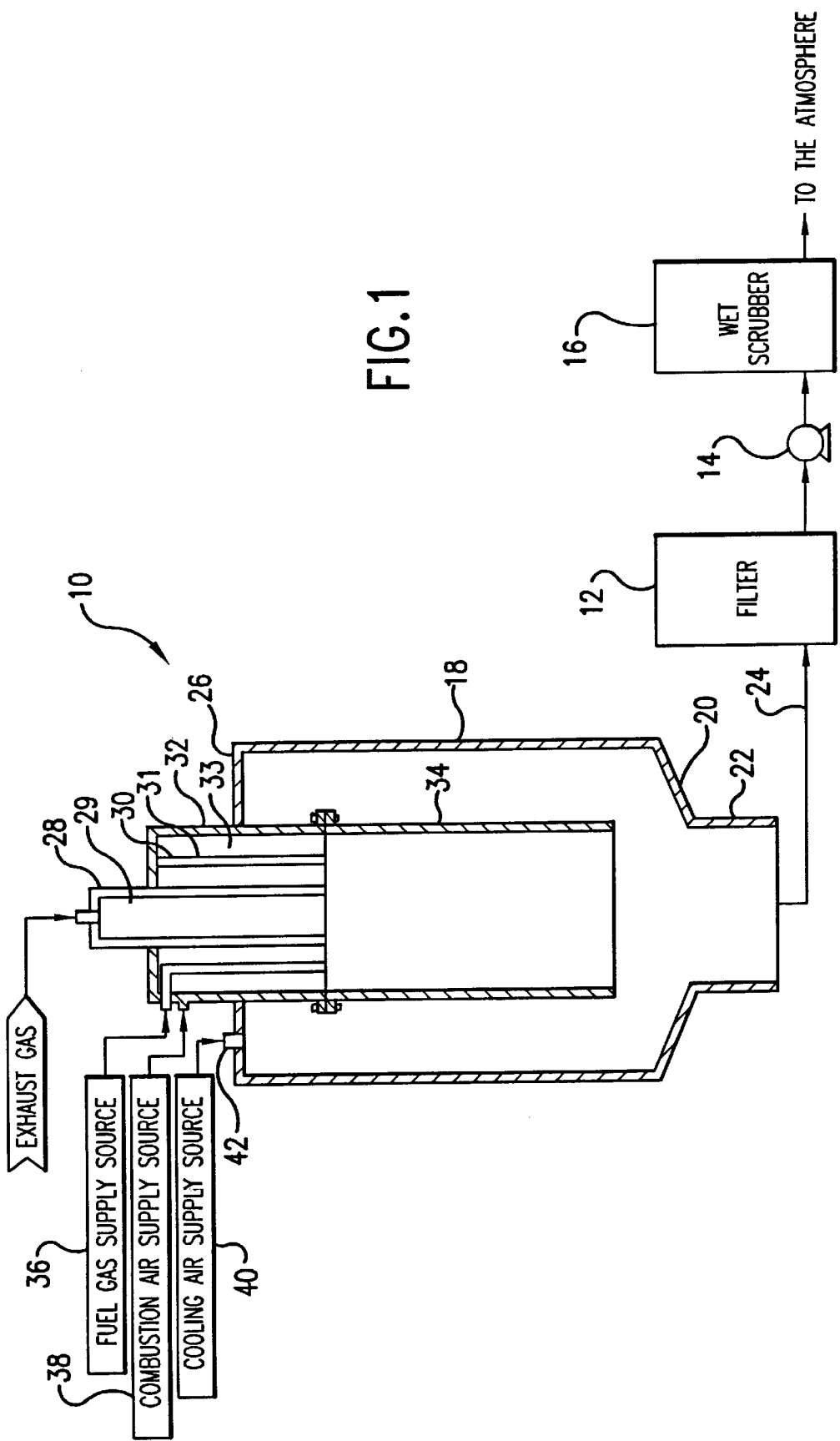
FIG. 1 is a general schematic illustration of an exhaust gas treatment installation showing the first embodiment of the exhaust gas treatment unit according to the present invention.

FIG. 1 shows one embodiment of an exhaust gas treatment installation comprising an exhaust gas treatment unit according to the present invention. The installation includes an exhaust gas treatment unit 10, a filter 12 positioned downstream of the exhaust gas treatment unit 10 for filtering oxidized products resulting from the oxidized reaction, an exhaust blower 14 positioned downstream of the filter 12, and a wet scrubber 16 positioned downstream of the exhaust blower 14. The filter 12, the exhaust blower 14 and the wet scrubber 16 are of the types usually used in exhaust gas treatment installations and so a description of the details of these features is not set forth.

The exhaust gas treatment unit 10 in shown in FIG. 1 includes a cylindrical treatment drum 18. This treatment drum 18 is vertically disposed, or is disposed in such a manner that its axis is vertically oriented.

The treatment drum 18 is provided with a bottom inclined plate 20 that has an outlet nozzle 22 formed at its center. This outlet nozzle 22 is connected to the filter 12 by way of a pipe 24. The treatment drum 18 is also provided with an upper plate 26. The central portion of the upper plate 26 is provided with a gas introduction part that includes an exhaust gas introduction tube 28 for introducing exhaust gas, a fuel gas introduction tube 30 for introducing fuel gas, and a combustion air introduction tube 32 for introducing combustion air.

This gas introduction part is constructed so that the exhaust gas introduction tube 28, the fuel gas introduction tube 30 and the combustion air introduction tube 32 are coaxially disposed relative to one another. The exhaust gas introduction tube 28 is disposed radially inwardly of the fuel gas introduction tube 30, and the fuel gas introduction tube 30 is disposed radially inwardly of the combustion air introduction tube 32. The interior of the exhaust gas introduction tube 28 functions as an exhaust gas introduction path 29, the annular space between the exhaust gas introduction tube 28 and the fuel gas introduction tube 30 functions as a fuel gas introduction path 31, and the annular space between the fuel gas introduction tube 30 and the combustion air introduction tube 32 functions as a combustion air introduction path 33. These introduction tubes 28, 30, 32 pass through the upper plate 26 of the treatment drum 18 and extend to a predetermined position in the upper portion of the treatment drum 18.

A flame tube 34 is connected to the lower end of the combustion air introduction tube 32. The lower end of the flame tube 34 extends to a point in the vicinity of the bottom plate 20 of the treatment drum 18 as shown in FIG. 1. The outlet portion of the fuel gas introduction path 31 is provided with a suitable ignition device such as an ignition plug (not specifically illustrated).

Exhaust gas from a facility such as a semiconductor manufacturing facility unit or the like is introduced into the upper end of the exhaust gas introduction tube 28 and flows into the interior of the exhaust gas introduction tube 28. The upper portion of the fuel gas introduction tube 30 is connected to a fuel gas supply source 36 for fuel gas such as methane gas, natural gas, propane gas, hydrogen gas or butane gas or a mixture of such gases. The upper portion of the combustion air introduction tube 32 is connected to a combustion air supply source 38. Further, a cooling air supply source 40 is connected to a cooling air introduction port 42 that is provided on the outer circumferential portion of the upper plate 26 of the treatment drum 18.

During treatment of an exhaust gas in the unit shown in FIG. 1, the exhaust gas is sent into the exhaust gas introduction tube 28. At the same time, the respective supply sources 36, 38, 40 for fuel gas, combustion air and cooling air and the exhaust blower 14 are driven or operated. By virtue of the operation of the supply sources 36, 38, 40, fuel gas and combustion air are supplied to the fuel gas introduction path 31 and the combustion air introduction path 33 respectively at a predetermined flow rate. When the ignition device is thereafter operated to fire the mixed gas comprising fuel gas and combustion air, the flame is brought into contact with the exhaust gas discharged from the lower end of the exhaust gas introduction tube 28 and thus, the decomposing treatment of substances contained in the exhaust gas is carried out. The oxidized products resulting from the reaction with the flame involve harmful and non-harmful products including solid particles and gaseous harmful and non-harmful species.

The flame of the mixed gas extends into the vicinity of the bottom plate 20 of the treatment drum 18 because of the presence of the flame tube 34, and as a result, the contact affect of the exhaust gas and flame is heightened. Accordingly, it is possible to thermally decompose even stable substances such as PFCS gases in the exhaust gas. Oxygen enriched gas, e.g., air (containing approximately 21% oxygen) or oxygen enriched air, including substantially pure oxygen, can be used as the combustion air, particularly to reach high temperatures necessary to decompose certain species.

When the cooling air supply source 40 is driven or operated, a large amount of cooling air is introduced into the annular space between the treatment drum 18 and the flame tube 34. The cooling air is mixed in the lower portion of the treatment drum 18 with the treated exhaust gas discharged from the lower end of the flame tube 34. Thus, the cooling of the exhaust gas which has been heated to a high temperature in the flame tube 34 is performed. At the same time, the dilution of the exhaust gas is also carried out because the exhaust gas is mixed with a large amount of air. Since this cooling air passes around the flame tube 34, it functions as a thermal shield for the same flame tube 34. Accordingly, there is no need to provide a heat insulator on the outer circumference of the treatment drum 18.

The treated exhaust gas which has been cooled down and diluted by the cooling air is discharged from the outlet nozzle 22 of the treatment drum 18 by the suction force of the exhaust blower 14. The oxidized products are then filtered with filter 12 to remove solid particles, including dust and the like, and produce gaseous harmful and non-harmful species. After the treated exhaust gas passes through the filter 12 and the exhaust blower 14, the gas is further purified in the wet scrubber 16 and is finally discharged to the outside. The gaseous harmful and non-harmful species are scrubbed in the scrubber to release only non-harmful species to the environment.

Experimental results obtained by treating exhaust gas through use of the exhaust gas treatment unit 10 described above and illustrated in FIG. 1 are shown in the following table. The exhaust gas treatment unit employed in the experimental tests included a treatment drum 18 having an internal diameter of 400 mm and a flame tube 34 having a length of 800 mm. The objective gases that were used in the tests were $NF_3$, $NH_3$, $SiH_4$ and $PH_3$. These gases were diluted with nitrogen gas in a manner similar to the exhaust gas from a semiconductor manufacturing unit. Methane was used as the fuel gas at a flow rate of 17 liter/min, while the flow rate of the combustion air was regulated to be 480 liter/min and the flow rate of the cooling air was controlled to be 20,000 liter/min.

TABLE 1

| Objective Exhaust Gas | Flow Rate of Objective Exhaust Gas (liter/min) | Diluting Nitrogen Gas (liter/min) | Concentration of Gas at Outlet (ppm) *1 |
|---|---|---|---|
| $NF_3$ | 24.0 | 1,000 | 2–3 (10) |
| $NH_3$ | 25.0 | 1,000 | <1 (25) |
| $SiH_4$ | 10.0 | 1,000 | <1 (5) |
| $PH_3$ | 0.2 | 1,000 | <0.1 (0.3) |

*1 TLV according to ACGIH in parentheses

As can be seen from this table, even in the case of stable $NF_3$, the gas concentration in the treated exhaust gas discharged from the outlet nozzle 22 was less than the TLV (threshold level value) specified in ACGIH (American Conference of Governmental Industrial Hygienists) when the exhaust gas was treated by the exhaust gas treatment unit 10 according to the present invention. As to the $NH_3$, $SiH_4$ and $PH_3$ combustible gases, the results obtained were highly favorable as their concentrations were significantly lower than the TLV values.

Judging from the fact that the treated exhaust gas at the outlet nozzle 22 had a temperature of about 50° C. and the internal temperature of the flame tube 34 reached 800–1,000° C., it can be seen that cooling was also effectively carried out. In a case where the temperature of the outlet nozzle 22 was about 50° C., there was no detrimental influence upon succeeding equipment, even in the absence of a special cooling device.

Although the treatment drum 18, the exhaust gas introduction tube 28, the fuel gas introduction tube 30 and the combustion air introduction tube 32 are described and illustrated as being cylindrical, their form is not limited to this particular configuration. The exhaust gas treatment unit may be composed of a treatment drum, exhaust gas introduction tube, fuel gas introduction tube, combustion air introduction tube and flame tube which are, for example; quadrangular in cross-section.

In addition, an extension portion formed by extending the combustion air introduction tube 32 may be used as the flame tube, thereby negating the need to provide the flame tube 34 separately from the combustion air introduction tube 32. Although the exhaust gas treatment unit is vertically placed in the aforementioned embodiment, it may be horizontally placed, or it may be disposed so that gas is permitted to flow upwardly from below.

FIG. 2 and FIG. 3 show a second embodiment of the exhaust gas treatment unit 10' according to the present invention. The construction of this second embodiment is essentially the same as that of the first embodiment shown in FIG. 1, except that a plurality of exhaust gas introduction tubes 28a, 28b, 28c, 28d are disposed inside of the fuel gas introduction tube 30. In the arrangement shown in FIG. 3, four exhaust gas introduction tubes are provided. The exhaust gas introduction tubes 28a, 28b, 28c, 28d are held in one holder tube 50. In order to enclose the space formed between the exhaust gas introduction tubes 28a, 28b, 28c, 28d in the interior of the holder tube 50, a lid plate 52 is preferably attached at the lower end of the holder tube 50.

Additionally, in this embodiment, an extension portion formed by extending the lower portion of the combustion air introduction tube 32 is used as the flame tube.

In a semiconductor manufacturing facility, different kinds of exhaust gases are usually discharged and these exhaust gases will be introduced in turn into an exhaust gas treatment unit by use of a switch-over valve. The exhaust gas treatment unit 10' shown in FIG. 2 and FIG. 3 makes it possible to take in and decompose plural kinds of exhaust gases at the same time, whereby the treatment efficiency is improved to a great extent. The respective exhaust gas introduction tubes 28a, 28b, 28c, 28d may be made exclusively usable for special or specific types of gases. This will reduce concerns about gases that are different in kind being mixed and reacted with each other in the exhaust gas introduction tubes.

Although the plurality of exhaust gas introduction tubes 28a, 28b, 28c, 28d are disposed in a holder tube 50 in the embodiment shown in FIG. 2 and FIG. 3, a similar result can be achieved in different ways. For example, as shown in FIGS. 4(a), 4(b) and 4(c), a partition element or plate 54 can be provided in the exhaust gas introduction tube 28 so that a plurality of exhaust gas introduction paths 29a, 29b, 29c, 29d are formed in the inside of the exhaust gas introduction tube 28. The partition element 54 can take various forms as shown in FIGS. 4(a), 4(b) and 4(c) to divide the interior of the exhaust gas introduction tube 28 into exhaust gas introduction paths 29a, 29b, 29c, 29d having different cross-sectional shapes.

When an exhaust gas such as $SiH_4$, $PH_3$ or $B_2H_6$ used in the manufacture of semiconductors is treated by combustion, a large amount of powders are oftentimes generated as a product oxide. These powders have a tendency to deposit on the end portion of the exhaust gas introduction tube 28 on the outlet side. If such deposition of powders builds up over time, an obstacle to the formation of a normal flame is created and this can undesirably lower the treatment efficiency of the unit.

It is therefore preferred that a powder scrape-off device be provided at the end portion of the exhaust gas introduction tube 28 on the outlet side. FIG. 5 is a cross-sectional view of the exhaust gas treatment unit 10' shown in FIG. 2, showing an impeller 60 provided as a powder scrape-off device. As shown in FIG. 5, the impeller 60 is rotatably supported at the center of the lid plate 52 and is designed so as to be rotated by exhaust gas currents from the exhaust gas introduction tubes 28a, 28b, 28c, 28d. As can be seen from FIG. 5, the blades 62 of the impeller 60 are arranged very close to the lower end of the exhaust gas introduction tubes 28a, 28b, 28c, 28d. Accordingly, when the impeller 60 is rotated by the exhaust gas, the blades 62 move across the lower end of the exhaust gas introduction tubes 28a, 28b, 28c, 28d, thereby scraping off powder deposited on the lower end of the exhaust gas introduction tubes 28a, 28b, 28c, 28d. Of course, the powder scrape-off device is not limited to the impeller 60, but can take a variety of other forms that permit removal of powder at the lower end of the exhaust gas introduction tubes 28a, 28b, 28c, 28d. For example, a scrape-off plate which is rotated by a motor may be provided in place of the impeller.

As shown in FIG. 6, the impeller 60 is preferably accommodated in contact with the lid plate 52 outside of the exhaust gas introduction tubes 28a, 28b, 28c, 28d when not used. By virtue of such accommodation, the impeller 60 will not disturb the flow path of the exhaust gas when the exhaust gas is being treated.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. An exhaust gas treatment unit comprising:
a treatment drum having a side wall, a first end, a second end, and an interior;
a flame tube positioned within the interior of the treatment drum with a space being provided between the flame tube and the side wall of the treatment drum;
a combustion air introduction tube attached at the first end of said treatment drum with the flame tube connected to and extending from the combustion air introduction tube to introduce combustion air to the flame tube;
a combustion air supply source connectable to said combustion air introduction tube;
a fuel gas introduction tube disposed in said combustion air introduction tube to introduce fuel gas to the flame tube;
an exhaust gas introduction tube disposed in said fuel gas introduction tube to introduce exhaust gas to the flame tube;
cooling air introduction means for introducing cooling air into the space between the side wall of said treatment drum and said flame tube;
a cooling air supply source connectable to said cooling air introduction means, said cooling air supply source being different from said combustion air supply source; and
an outlet nozzle provided at said second end of said treatment drum to discharge treated exhaust gas from the treatment drum.

2. An exhaust gas treatment according to claim 1, wherein said exhaust gas introduction tube includes a plurality of exhaust gas introduction tubes disposed in said fuel gas introduction tube.

3. An exhaust gas treatment unit according to claim 1, wherein said exhaust gas introduction tube includes an inside that is divided into a plurality of exhaust gas introduction paths.

4. An exhaust gas treatment unit according to claim 3, wherein the exhaust gas introduction tube includes an exhaust gas outlet side, and including means disposed adjacent an end portion of said exhaust gas introduction tube on the exhaust gas outlet side for removing powder from the end portion of said exhaust gas introduction tube.

5. An exhaust gas treatment unit according to claim 2, wherein each of the exhaust gas introduction tubes includes an exhaust gas outlet side, and including means disposed adjacent an end portion of said exhaust gas introduction tubes on the exhaust gas outlet side for removing powder from the end portion of said exhaust gas introduction tubes.

6. An exhaust gas treatment unit according to claim 1, wherein the exhaust gas introduction tube includes an exhaust gas outlet side, and including means disposed adjacent an end portion of said exhaust gas introduction tube on the exhaust gas outlet side for removing powder from the end portion of said exhaust gas introduction tube.

7. An exhaust gas treatment unit comprising:
a treatment drum having a side wall, an inlet end, and an interior;
a combustion air introduction tube attached at the inlet end of said treatment drum to introduce combustion air;
a combustion air supply source connectable to said combustion air introduction tube;
a fuel gas introduction tube disposed in said combustion air introduction tube to introduce fuel gas, said fuel gas introduction tube having an outlet end;
an exhaust gas introduction tube disposed in said fuel gas introduction tube to introduce exhaust gas, the exhaust gas introduction tube having an outlet end, the combustion air introduction tube defining a flame tube extending longitudinally beyond the outlet end of the exhaust gas introduction tube and said outlet end of said fuel gas introduction tube, a space being provided between the flame tube and the sidewall of the treatment drum;
cooling air introduction means for introducing cooling air into the space between the side wall of said treatment drum and said flame tube;
a cooling air supply source connectable to said cooling air introduction means, said cooling air supply source being different from said combustion air supply source; and
an outlet nozzle provided in said treatment drum to discharge treated exhaust gas from the treatment drum.

8. An exhaust gas treatment unit according to claim 7, wherein said exhaust gas introduction tube includes a plurality of exhaust gas introduction tubes disposed in said fuel gas introduction tube.

9. An exhaust gas treatment unit according to claim 7, wherein said exhaust gas introduction tube includes an inside that is divided into a plurality of exhaust gas introduction paths.

10. An exhaust gas treatment unit according to claim 7, wherein the exhaust gas introduction tube includes an exhaust gas outlet side, and including means disposed adjacent an end portion of said exhaust gas introduction tube on the exhaust gas outlet side for removing powder from the end portion of said exhaust gas introduction tube.

11. An exhaust gas treatment unit comprising:
a treatment drum having a side wall, an inlet end, and an interior;
a flame tube positioned within the interior of the treatment drum with a space being provided between the flame tube and the side wall of the treatment drum;
a combustion air introduction tube connected to a source of combustible air and attached at the inlet end of said treatment drum, with the flame tube connected to and extending longitudinally beyond the combustion air introduction tube to introduce combustion air from the source of combustible air to the flame tube;
a fuel gas introduction tube connected to a source of fuel gas and disposed in said combustion air introduction tube to introduce fuel gas to the flame tube, said fuel gas introduction tube having an outlet end and said flame tube extending longitudinally beyond the outlet end of the fuel gas introduction tube;
an exhaust gas introduction tube connected to a source of exhaust gas and disposed in said fuel gas introduction tube to introduce exhaust gas to the flame tube, the exhaust gas introduction tube having an outlet end and the flame tube extending longitudinally beyond the outlet end of the exhaust gas introduction tube;

cooling air introduction means connected to a source of cooling air for introducing cooling air into the space between the side wall of said treatment drum and said flame tube to thereby cool exhaust gas discharged from the flame tube and dilute the exhaust gas discharged from the flame tube;

said cooling air source being different from said combustible air source; and an outlet nozzle provided in said treatment drum to discharge treated exhaust gas from the treatment drum.

12. An exhaust gas treatment unit according to claim 11, wherein said exhaust gas introduction tube includes a plurality of exhaust gas introduction tubes disposed in said fuel gas introduction tube.

13. An exhaust gas treatment unit according to claim 11, wherein said exhaust gas introduction tube includes an inside that is divided into a plurality of exhaust gas introduction paths.

14. An exhaust gas treatment unit according to claim 11, wherein the exhaust gas introduction tube includes an exhaust gas outlet side, and including means disposed adjacent an end portion of said exhaust gas introduction tube on the exhaust gas outlet side for removing powder from the end portion of said exhaust gas introduction tube.

* * * * *